Feb. 9, 1960 S. D. ROBERTSON 2,924,797
FINLINE COUPLER
Filed Nov. 29, 1955 7 Sheets-Sheet 1
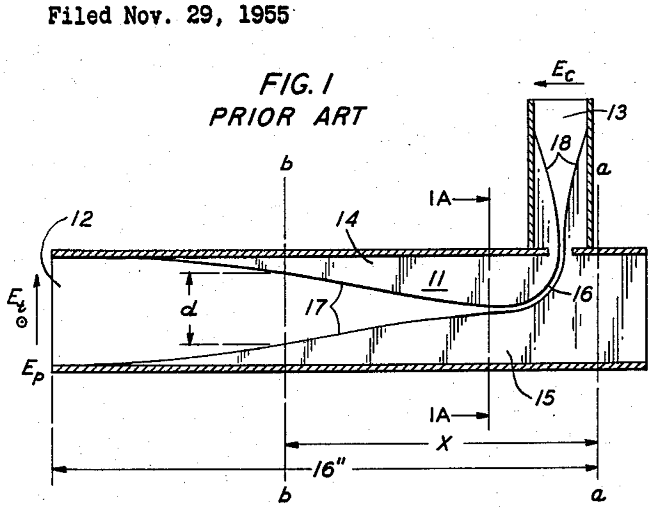
FIG. 1A
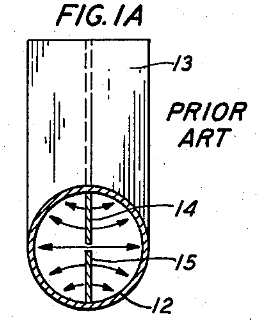
FIG. 2, FIG. 3
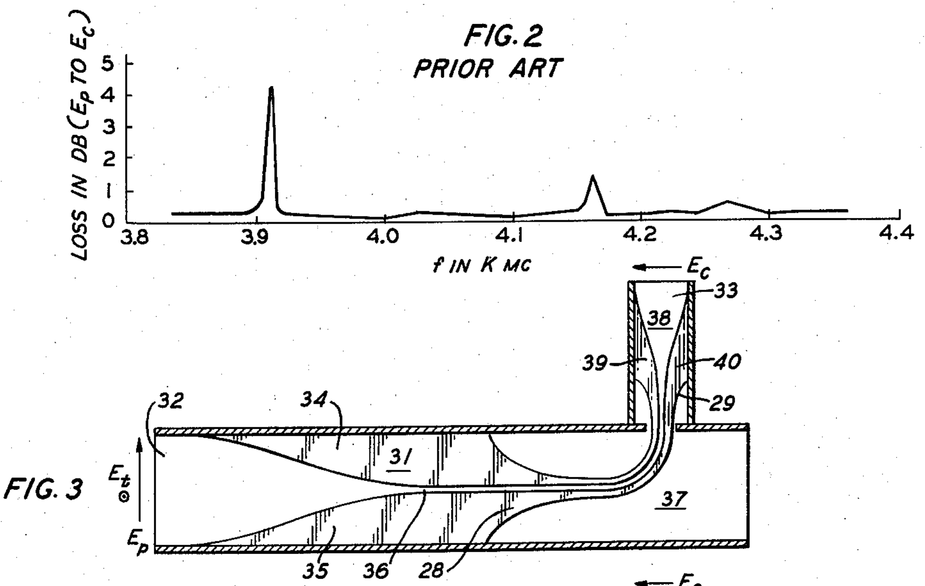
FIG. 4
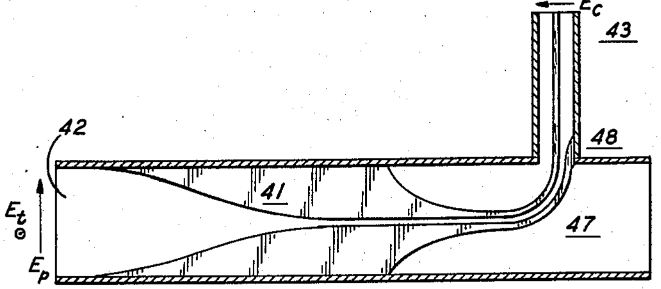
INVENTOR
S. D. ROBERTSON
BY
Arthur J. Torsiglieri
ATTORNEY Feb. 9, 1960 S. D. ROBERTSON 2,924,797

FINLINE COUPLER

Filed Nov. 29, 1955 7 Sheets-Sheet 2

INVENTOR
S. D. ROBERTSON
BY
[illegible]
ATTORNEY

INVENTOR
S. D. ROBERTSON
BY
Arthur J. Torsiglieri
ATTORNEY

INVENTOR
S. D. ROBERTSON
BY
Arthur J. Torsiglieri
ATTORNEY

FINLINE COUPLER

Filed Nov. 29, 1955

INVENTOR
S. D. ROBERTSON
BY
Arthur J. Torsiglieri
ATTORNEY

Feb. 9, 1960 S. D. ROBERTSON 2,924,797

FINLINE COUPLER

Filed Nov. 29, 1955 7 Sheets-Sheet 6

INVENTOR
S. D. ROBERTSON
BY
Arthur J. Torsiglieri
ATTORNEY

Feb. 9, 1960 S. D. ROBERTSON 2,924,797

FINLINE COUPLER

Filed Nov. 29, 1955 7 Sheets-Sheet 7

INVENTOR
S. D. ROBERTSON
BY
Arthur J. Torsiglieri
ATTORNEY

United States Patent Office 2,924,797

Patented Feb. 9, 1960

2,924,797

FINLINE COUPLER

Sloan D. Robertson, Fair Haven, N.J., assignor to Bell Telephone Laboratories, Incorporated, New York, N.Y., a corporation of New York Application November 29, 1955, Serial No. 549,734

13 Claims. (Cl. 333—98)

The present invention relates to high frequency wave couplers, and more particularly to improvements in wave couplers of the finline type disclosed in my copending application Serial No. 485,671, filed Feruary 2, 1955, and copending application Serial No. 485,672 by H. T. Friis and S. D. Robertson, filed the same date.

Finline couplers are used for coupling two waveguiding paths and generally comprise two thin conductive fins spaced apart along their length for forming a continuous wave path along the interspace between the fins. The path along the interspace is advantageously very narrow along the intermediate portion of its length for closely confining the propagating wave energy and modified at both ends for matching the characteristic impedance of narrow intermediate portion of the path to the respective characteristic impedances of the first and second waveguiding paths.

Such couplers are characterized by extremely broad band operation, of the order of three or more to one in frequency range. For example, tests on a typical finline coupler built to operate in the 8 kilomegacycle range show that its bandwidth extends from 4 to at least 12 kilomegacycles. Another characteristic of the finline coupler is polarization selectivity. A finline will couple only to electric fields extending in a plane parallel to the plane of its two fins. For example, if two signal waves polarized to have their electric field vectors mutually perpendicular are transmitted to the finline, one with its electric vector parallel to the plane of the finline and the other with its electric vector transverse thereto, the signal wave with the electric vector parallel to the finline will travel along the finline for coupling thereby to a second waveguiding path, whereas the transversely polarized wave will continue past the finline substantially unaffected thereby since the finline presents an equipotential surface to the transversely polarized wave and as a consequence does not severely disturb that wave.

For minimizing disturbance to such wave of transverse mode, the conductive fins of the finline should be made as thin as possible. However, efforts to minimize disturbance of the wave of transverse mode by making the fins very thin are found to result in the occurrence of several sharp peaks in the transmission loss characteristic of the coupler. These peaks are particularly pronounced when the spacing along the intermediate portion of the wave path between the fins is increased in an effort to increase the characteristic impedance of such portion of wave path so that a shorter impedance transforming section is required at the ends for matching to the waveguiding paths being coupled.

A principal object of the present invention is to make feasible in a finline coupler the use of extremely thin fins with increased spacing therebetween, with a consequent improvement in the transmission of signal waves of transverse mode past the finline and a decrease in length of the impedance matching end sections, without experiencing undesirable peaks in the coupler transmission loss characteristic.

In investigating the cause of the loss peaks, I have found that they arise when spurious modes are initiated in the region surrounding the finline. Moreover, as will be explained in more detail hereinafter, it has been found that the finline serves to form a resonator for wave energy in these spurious modes which resonates at frequencies for which the electrical length of the resonator is a half wavelength or an integral multiple thereof. At such frequencies an appreciable amount of wave energy passing along the finline is coupled to the spurious modes with a consequent high loss to the signal wave traveling along the finline. The present invention is based to a considerable extent on the recognition of the cause for the loss peaks in the transmission characteristic, and the provision of solutions for their elimination.

The present invention provides two solutions for the elimination of the loss peaks, which may be used independently or in concert for increased effect. The first is to reduce the coupling of the signal wave to the spurious modes. The second is selectively to attenuate the wave energy in the spurious modes, thereby damping out the resonance in these modes without affecting significantly the signal wave transmission either along the finline or transverse thereto. The present invention may be embodied in various arrangements, each of which uses one or both of the above techniques.

In accordance with one solution, a feature of the present invention is the inclusion of a section of two-wire line for guiding wave energy around a bend between seprate sections of finline. By utilizing a section of the two-wire line between two sections of finline for circumventing the bend, the coupling to the spurious modes is reduced appreciably.

In accordance with the other solution, a second and distinct feature of the present invention is the use of lossy material extending coplanar with the finline so as not to disturb the signal wave transverse thereto and positioned to attenuate selectively energy in the spurious modes without affecting significantly transmission along the finline.

In a first illustrative embodiment for transferring wave energy from a hollow conductively bounded wave guide to a second waveguiding path, the finline coupler therebetween comprises two separate finline sections which are coupled by a two-wire transmission line.

In a second illustrative embodiment of the present invention for coupling between a hollow conductively bounded wave guide and a second waveguiding path angularly disposed with respect to the conductively bounded wave guide, a finline having tapered portions at its ends is positioned to have one end extend axially into the conductively bounded wave guide and the other end extend axially into the second waveguiding path, and a sheet of lossy material is positioned adjacent to and coplanar with the finline in the conductively bounded wave guide.

A third illustrative embodiment for transferring wave energy from a hollow conductive wave guide to a second waveguiding path comprises two separate finline sections which are coupled by a two-wire transmission line, and additionally a sheet of lossy material is positioned adjacent to and coplanar with the first finline section.

The above and other objects, features and advantages of the present invention will be more clearly understood by referring to the following detailed description taken in connection with the accompanying drawing, in which:

Figs. 1 and 1A are longitudinal sectional and cross-sectional views, respectively, of a finline coupler of the prior art shown for purposes of explanation;

Fig. 2 is a plot of the transmission loss characteristic found typical of a coupler of the kind shown in Fig. 1;

Figs. 3–6 are longitudinal sectional views of various embodiments of the present invention which afford reduced coupling between the signal wave and the undesired spurious modes;

Figure 5:
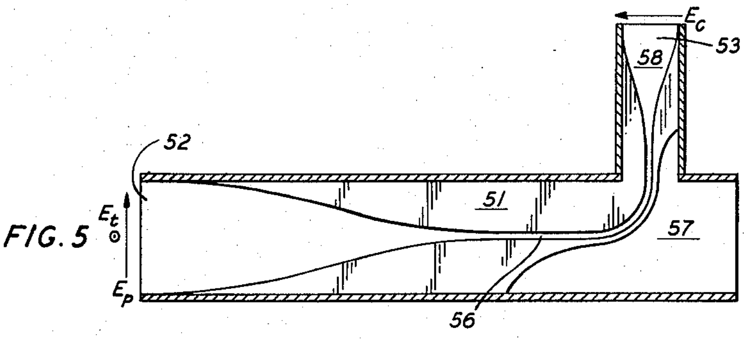

Referring now more particularly to the drawing, Fig. 1 shows a finline 11 for coupling between hollow conductively bounded circular wave guides 12 and 13. The finline comprises thin conductive fin elements 14 and 15 providing a wave path along the interspace 16 between the fins. Wave path 16 has a narrow section intermediate its length and tapered sections at each end. Tapered section 17 serves both to convert wave energy from the wave guide mode along main wave guide 12 to the finline mode for propagation along the finline and to match the characteristic impedances of the wave guide to that of the narrow section of finline wave path. Similarly, tapered section 18 serves both to convert wave energy from the finline mode to a wave guide mode along branch wave guide 13 and to match the characteristic impedance of the narrow finline section to that of wave guide 13. Finlines of this type, as well as those to be discussed hereinafter, can conveniently be constructed by appropriately machining a conductive sheet, or by depositing a conductive layer in the shape of the fins on one or both sides of a dielectric sheet, or by photoetching or other known techniques.

In operation, wave energy polarized in the plane of finline 11, as represented by vector $E_p$ (subscript $p$ signifying parallel), and propagating from left to right along wave guide 12 is coupled via finline 11 to branch wave guide 13. Contrariwise, wave energy polarized transverse to finline, as shown by vector $E_t$ (subscript $t$ signifying transverse), passes substantially undisturbed through the region of the finline and continues along wave guide 12. In practice efforts to reduce the thickness of the fins for minimizing the disturbance of the transverse wave have resulted in several peaks in the transmission loss characteristic of the finline. Fig. 2 shows a transmission loss versus frequency plot for a typical finline of the kind shown in Fig. 1 having the following dimensions: a main wave guide 12 diameter of two inches, fin thickness 1/16 of an inch, spacing between the fins along their closely spaced section 1/64 of an inch, a finline length of 16 inches along the main wave guide, a radius of curvature of 3/4 of an inch along the curved portion of wave path 16, and a length of tapered section along wave guide 12 of 14 inches. The curve plotted shows the energy loss, measured in decibels, of a wave traveling through the finline wave path from wave guide 12 to branch wave guide 13 for frequencies from 3.8 to 4.4 kilomegacycles. Additional tests taken up to 12 kilomegacycles disclosed additional loss peaks of varying heights. A study of the causes of these loss peaks resulted in the following explanation for their presence.

Wave energy in propagating along wave path 16 of the finline initiates spurious modes in wave guide 12. The exact point of initiation of these spurious modes along the finline wave path is difficult to ascertain but it is believed that initiation of such modes occurs along a distributed section of the curved portion of wave path 16. The spurious modes take the form of half-cylinder modes as shown by the arrows of Fig. 1A. Energy coupled to these modes travels along wave guide 12 to the end of the finline in wave guide 12, at line $a$ of Fig. 1. The finline at this line acts essentially as a short circuit, since the oppositely directed vectors of the half-cylinder modes cancel as the conductive fin element dividing the cylinder terminates. Wave reflection, therefore, occurs at this line and the reflected wave energy then passes from right to left in the half-cylinder modes until it is again reflected at line $b$. The effect is as though a resonant chamber were formed between the reflection points in wave guide 12. At frequencies where this "virtual" chamber resonates, a substantial portion of energy is coupled thereto from the signal wave along finline wave path 16, with a consequent high loss of energy from the wave at that frequency.

The effective location of reflection line $b$ can be determined as follows. First, it can be appreciated that the distance $x$ between lines $a$ and $b$ is necessarily a multiple of a half wavelength at frequencies of resonance, which correspond to frequencies of high loss. That is, for resonance:

$$x=\frac{n\lambda_g}{2} \tag{1}$$

where $\lambda_g$ is the guide wavelength of wave guide 12 and $n$ is any positive integer. Equation 1 is then combined with the following well known expressions:

$$\lambda_g=\frac{\lambda}{\sqrt{1-\left(\frac{\lambda}{\lambda_c}\right)^2}} \tag{2}$$

where $\lambda$ is wavelength in free space, $\lambda_c$ is the cut-off-wavelength for the half-cylinder modes, and:

$$f=\frac{c}{\lambda} \tag{3}$$

where $c$ is the speed of light, to give $$f^2=c^2\left[\left(\frac{n}{2x}\right)^2+\left(\frac{1}{\lambda_c}\right)^2\right] \tag{4}$$

This equation contains three unknowns which can readily be determined by experimentally determining the frequency of three successive peaks in the transmission loss curve, for example by maintaining $E_p$ constant in level and measuring $E_c$ to determine three frequencies at which $E_c$ sharply drops to some minimum level and then rises again. The three resonant frequencies, in cycles per second, are then substituted for $f$ in Equation 4 to form three simultaneous equations, which can be solved for $n$, $x$, and $\lambda_c$, taking into account that the value of $n$ increases by one for each successive peak. Distance $x$ for the coupler described was calculated to be approximately 10.9 inches, which fixes line $b$ at a point where the distance $d$ of Fig. 1 measures approximately six-tenths of the guide diameter; and $\lambda_c$ was found to be approximately 3.34 inches. Once there is realized the nature of the spurious modes and the region that they occupy along wave guide 12, couplers may be devised which inhibit coupling to those modes and/or selectively attenuate the modes without disturbing transmission of the waves represented by vectors $E_p$ or $E_t$.

To this end, it has been found that coupling to the spurious modes can be reduced by confining the wave energy more closely to the finline wave path as it travels along the curved portion of wave path 16 of Fig. 1. This may be accomplished by reducing the spacing between the fins along the curved portion, or by increasing the thickness of the fins, or both. However, as discussed above, increasing the thickness increases the disturbance suffered by a transverse wave in passing the finline and therefore cannot be resorted to in applications where this effect is a serious disadvantage. Further, either increasing the fin thickness or decreasing the spacing between the fins increases the capacity between the fins and therefore decreases the characteristic impedance of the finline. In such a case longer tapered sections are required for matching the low characteristic impedance of the closely spaced section of finline to the higher characteristic impedance of the wave guides. It is therefore undesirable in application where it is advantageous to minimize the length of the impedance matching section either to reduce the spacing between the fins or to increase the fin thickness. Alternative solutions must therefore be found for eliminating the high loss peaks.

To this end, Fig. 3 shows a composite finline coupler for transferring wave energy between two hollow conductively-bounded wave guides 32 and 33. This composite coupler comprises a finline 31 coupled to and coplanar with a section of balanced two-wire transmission line 37 which is, in turn, coupled to a second finline section 38. Finline section 31 comprises two fins 34 and 35 spaced apart along their length for providing a wave path 36 therealong. The fins are closely spaced over a section of their length and tapered at their left-hand end for impedance matching and mode conversion from wave guide 32 into the closely spaced section. The finline is advantageously shaped so that the closely spaced section of wave path 36 begins to the left of the region where the height of the fins is diminished toward their right-hand end over region 28 for transition into the balanced two-wire line 37. With such an arrangement, wave energy is closely confined in the narrow portion of the finline wave path 36 as it passes the region 28 and is not appreciably affected thereby. Similarly, finline 38 comprises fin elements 39 and 40, being closely spaced over the portion of their length proximate two-wire line 37 and tapered at one end. Again, the closely spaced region of the fins in this finline starts at a point above the region 29 where the height of the fins is diminished for transition into the two-wire line.

In operation, a wave polarized in the plane of finline 31, in passing from left to right along wave guide 32, is coupled via finline 31, two-wire line 37, and finline 38, to wave guide 33. Contrariwise, a wave polarized transverse to the plane of finline 31 will pass from left to right along wave guide 32 substantially undisturbed by either the finline or two-wire line. The loss peaks characteristic of the finline of Fig. 1 are virtually eliminated in the present coupler since coupling to the spurious half-cylinder modes is substantially reduced. Half-cylinder modes which tend to be initiated along the curved portion of wave path 36 cancel immediately since there is substantially no conductive barrier for separating two oppositely directed half-cylinder modes. Hence, the coupler is virtually incapable of supporting such modes.

A modification of the composite coupler of Fig. 3 is shown in Fig. 4. The composite coupler of this figure is used for coupling a hollow conductively-bounded wave guide 42 to a coaxial transmission line 43. The coupler comprises a finline section 41 coplanar with and coupled to a balanced two-wire line 47, which is, in turn, coupled to a transition section 48. Transition section 48 serves to match the characteristic impedance of the balanced two-wire line to that of the coaxial line 43 and to convert the wave energy from the mode of balanced two-wire line to that of the coaxial line. The operation of this coupler is substantially the same as that of the coupler of Fig. 3. Wave energy in the plane of finline 41 and two-wire line 47, in passing from left to right along wave guide 42, is coupled via finline 41, balanced two-wire line 47, and transition section 48, to coaxial line 43 with virtually an elimination of the loss peaks characteristic of the coupler of Fig. 1. Further, wave energy transverse to finline 41 continues along wave guide 42 past the region of the coupler substantially unaffected by the presence of the coupler.

Another form of a composite finline coupler of the kind shown in Fig. 3 is shown in Fig. 5. The composite coupler of this figure comprises a finline section 51 coplanar with and coupled to an intermediate transition section 57 which is, in turn, coupled to finline section 58, for coupling conductively-bounded wave guides 52 and 53. Intermediate transition section 57 comprises two spaced conductors. The spacing between these two conductors constitutes a transitional extension of finline wave path 56. Transition section 57 may be an unbalanced two-wire line. The term "unbalanced" two-wire line is used to denote a line having one conductor substantially larger in width than the other, as distinguished from a two-wire line comprising two conductors of substantially equal width, as shown for example in Fig. 3, which is referred to herein as a "balanced" two-wire line. As depicted in Fig. 5, however, the bottom conductor of transition section 57 is a thin wire line while the top conductor is a fin-like extension of the top fin of finline section 51. This coupler operates in essentially the same manner as the coupler of Fig. 3, and similarly virtually eliminates the peaks in the loss curve because of the absence of conductive material to the right of the curved portion of finline wave path 56.

Figure 6:
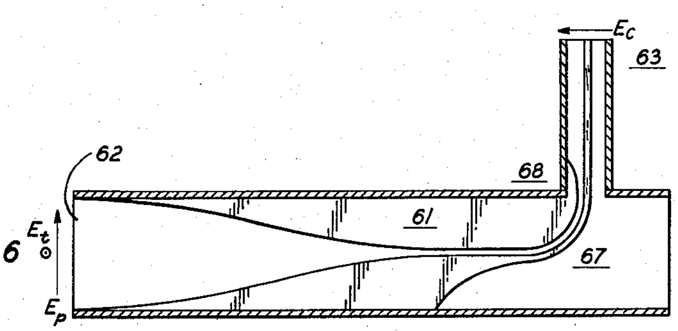

Another modification for coupling a circular wave guide to a coaxial transmission line is shown in Fig. 6. The coupler of this figure comprises finline section 61 coplanar with and coupled to an intermediate transition section 67 which is, in turn, coupled to a transition section 68, for coupling wave guide 62 to coaxial line 63. Intermediate transition section 67 is similar in all respects to section 57 of Fig. 5.

Figure 7:
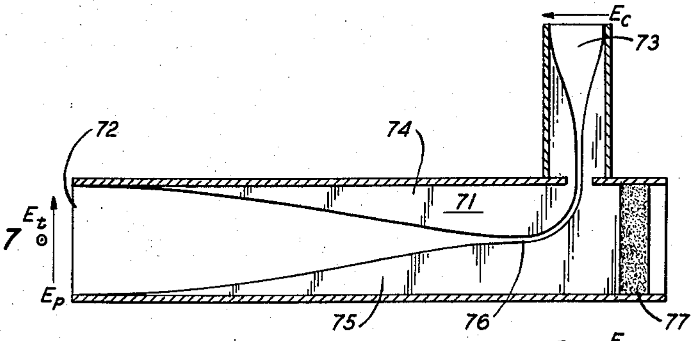
Figs. 7–24 are longitudinal sectional views of modifications of the present invention which serve to attenuate selectively the undesired spurious modes.

A further embodiment of the present invention is shown in Fig. 7. In this embodiment a finline coupler of the kind shown in Fig. 1 is modified to include a sheet of lossy material positioned to attenuate wave energy in the undesired spurious modes without appreciably attenuating signal waves $E_p$ or $E_t$. In this embodiment, finline 71 comprises conductive fin elements 74 and 75 spaced apart along their entire length for providing a wave path 76 between circular wave guides 72 and 73. Adjacent one end of fin element 75 and coplanar therewith there is provided a sheet 77 of lossy material, such as a colloidal carbon material coated on a dielectric card, which extends across the interior of wave guide 72. The sheet of lossy material is spaced away from wave path 76 and therefore does not affect wave energy passing therealong. The sheet is made of sufficient length in a direction along the axis of wave guide 72 to attenuate the wave energy in the half-cylinder modes which exists on both sides of finline 71 as explained with reference to Fig. 1. This effectively damps out the resonance of energy in these modes, virtually eliminating the loss peaks. In operation, wave energy polarized parallel to finline 71, in passing from left to right along wave guide 72, will be coupled via finline 71 to wave guide 73 with no high loss peaks, whereas wave energy transverse to the finline will pass from left to right along wave guide 72 substantially undisturbed by the finline, or lossy sheet 77 since it is coplanar with the finline, and continue along the wave guide. It is advantageous in some applications to form lossy sheet 77 by coating a dielectric card with a colloidal carbon material in such a manner that the density of the colloidal carbon deposit decreases in the direction away from fin element 75, thereby increasing the resistivity of the lossy sheet in that direction.

Figure 8:
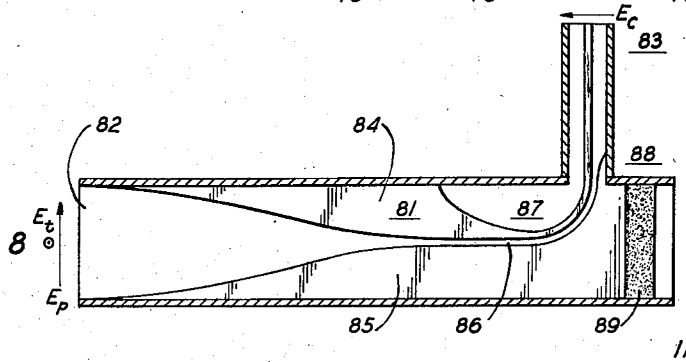

Fig. 8 shows a modification of the finline coupler of Fig. 7, for coupling a circular wave guide 82 to a coaxial transmission line 83. This coupler comprises a section of finline 81 coupled to an intermediate transition section 87 which is, in turn, coupled to a transition section 88. Intermediate transition section 87 is similar to section 57 of Fig. 5 except that the thin wire line constitutes the top conductor in this arrangement rather than the bottom conductor. Finline section 81 comprises fin elements 84 and 85 closely spaced along a portion of their length and tapered at one end for matching the characteristic impedance of wave guide 82 to the characteristic impedance of the closely spaced finline section. Fin element 85 also serves as one of the conductors of the intermediate transition section 87 and further serves as a tapered element in the transition section 88 for matching to coaxial line 83. Adjacent the end of fin 85 and coplanar therewith is positioned a sheet of lossy material 89. This sheet serves to attenuate wave energy in the half-cylinder modes which exist because of the metallic section 85 to the right of the wave path 86. In operation, wave energy polarized in the plane of finline 81, in passing from left to right along wave guide 82, is coupled via finline 81, intermediate transition section 87, and transition section 88 to coaxial line 83. Wave energy transverse to the finline coupler, however, passes from left to right along wave guide 82 undisturbed by the finline or lossy sheet 89.

Figure 9:
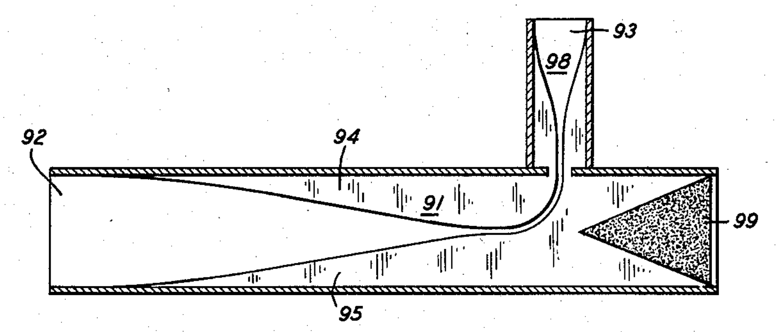
Figure 10:
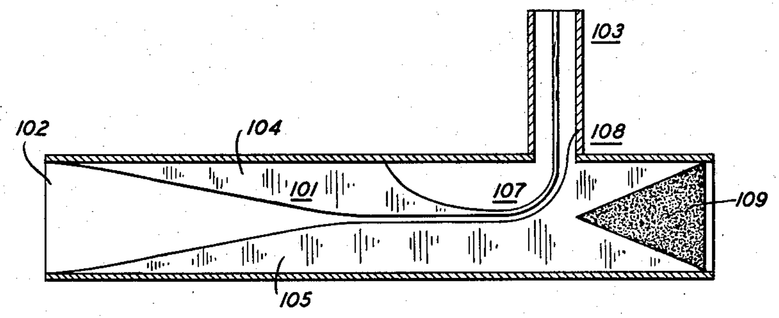
Figure 11:
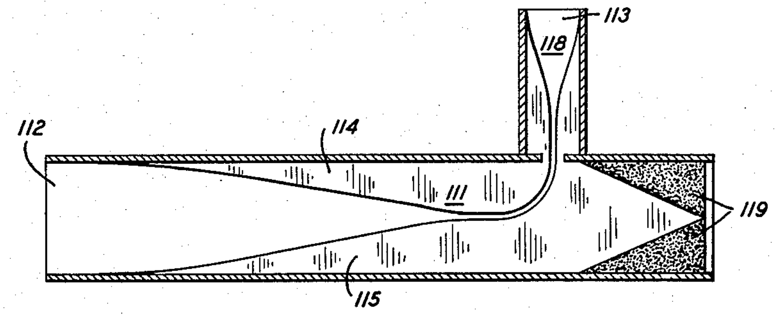
Figure 12:
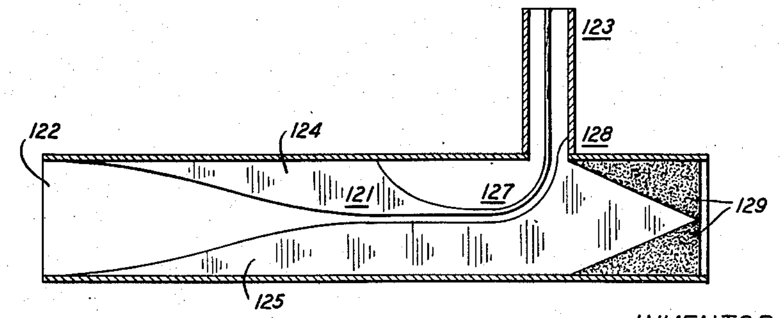

The finline couplers of Figs. 9 and 11 are modifications of the coupler of Fig. 7 wherein the lower fin element of the finline is tapered at its right-hand end and tapered sections of the lossy material 99 and 119, respectively, are positioned coplanar with the finline and adjacent its right-hand end. The operation of these finline couplers is substantially the same as that described in reference to Fig. 7, the tapered section of lossy material serving to provide attenuation for the half-cylinder modes which is substantially constant with changes in frequency. The couplers of Figs. 10 and 12 are similar modifications of the finline coupler of Fig. 8 wherein the lower finline element is tapered at its right-hand end and tapered sections of lossy material 109 and 129, respectively, are positioned coplanar with the finline and adjacent its right-hand end.

Figures 13, 14, 15, 16:
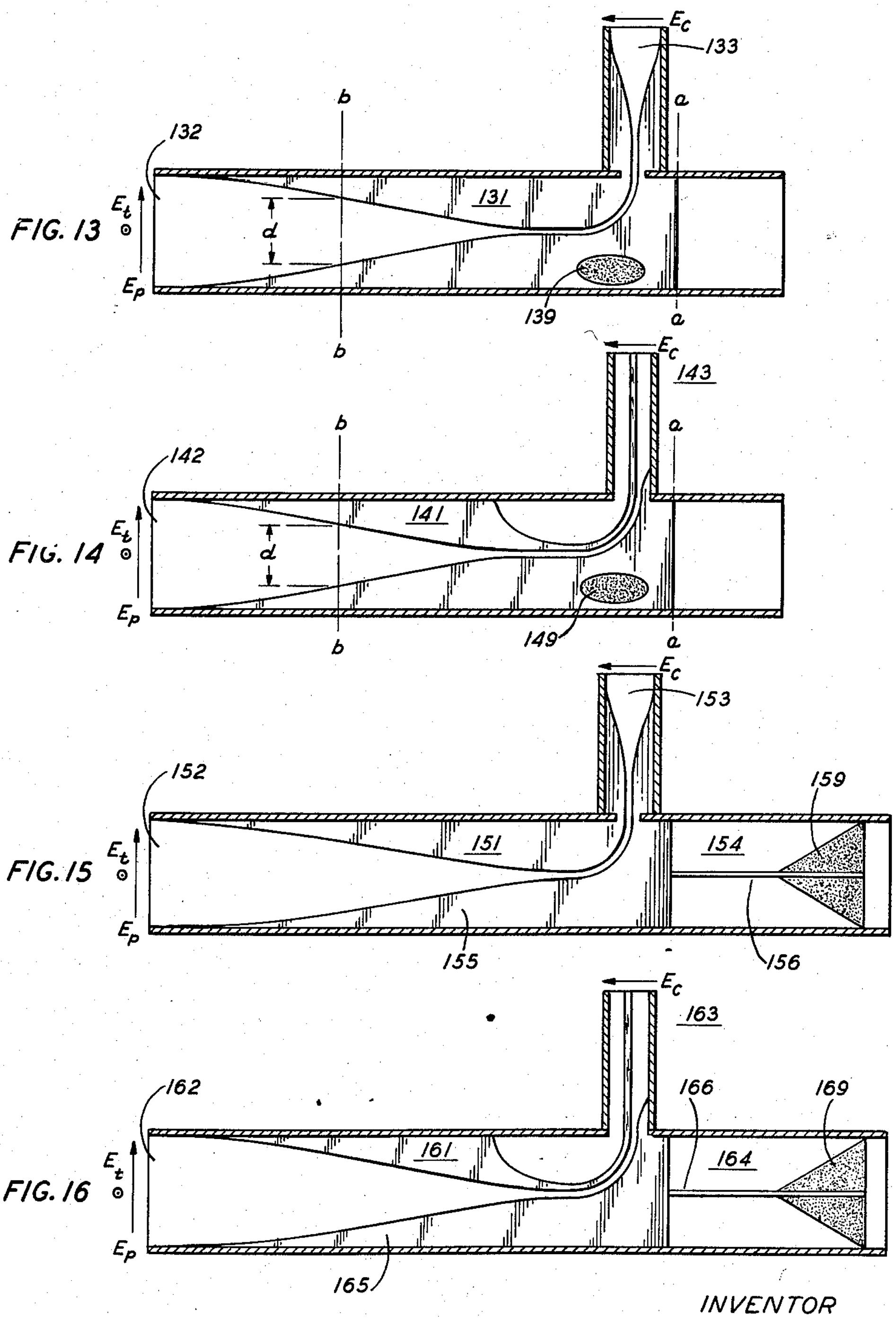

Figs. 13 and 14 show additional modifications of the couplers of Figs. 7 and 8, respectively, wherein a sheet of lossy material is positioned for selectively attenuating energy in the spurious half-cylinder modes. In these couplers lossy sheet sections 139 and 149 are positioned to be coplanar with finlines 131 and 141, respectively, within an aperture cut in the lower fin element of the respective finlines. The lossy sections are spaced out of coupling proximity with the wave path along the interspace between the fins so that it does not affect wave energy passing therealong, and further are positioned between points *a* and *b*, which define the region in which the half-cylinder modes exist. Point *b*, as discussed with respect to Fig. 1, is at a point where the spacing between the fins is approximately six-tenths of the main wave guide diameter. The operation of these couplers is essentially the same as that of Figs. 7 and 8.

The finline coupler of Fig. 15 shows an alternative modification of the coupler of Fig. 1 for selectively attenuating wave energy in the half-cylinder modes. In this modification the lower fin element 155 of finline 151 is terminated in a coaxial line 154. Conductor 156 is connected to the right-hand end of fin 155 and serves as the inner conductor of coaxial line 154, whereas wave guide 152 serves as the outer conductor thereof. It can be appreciated from the plot of the fields of the half-cylinder modes, shown in Fig. 1A, that the geometry of the fields is such as to convert readily to a coaxial mode for propagation along coaxial line 154. Coaxial line 154 is then terminated in its characteristic impedance by card 159 of suitable resistive material such as colloidal carbon coated on a dielectric card. The termination serves to dissipate energy which has been converted from the half-cylinder modes to a coaxial mode and effectively to damp out any resonance. Resitive card 159 and conductor 156 are coplanar with finline 151 so as not to have any appreciable effect on transverse wave $E_t$ propagating along wave guide 152. In operation, wave energy polarized parallel to the plane of finline 151, in passing along wave guide 152 from left to right is coupled via finline 151 to wave guide 153 without experiencing any substantial loss peaks. Wave energy transverse to finline 151, however, will pass along wave guide 152 through the region of the finline coupler without suffering any appreciable disturbance either by the finline or coaxial line termination.

Fig. 16 shows a modification of the coupler of Fig. 15, for coupling between a hollow wave guide and a coaxial line. As in Fig. 15, the lower conductive element 165 of the coupler is terminated in a coaxial line 164, comprising inner conductor 166 and outer conductor 162, which is, in turn, terminated by resistive card 169. Also as in Fig. 15, inner conductor 166 and resistive card 169 are coplanar with finline 161 for avoiding any attenuation of transverse wave $E_t$.

Figures 17, 18, 19, 20:
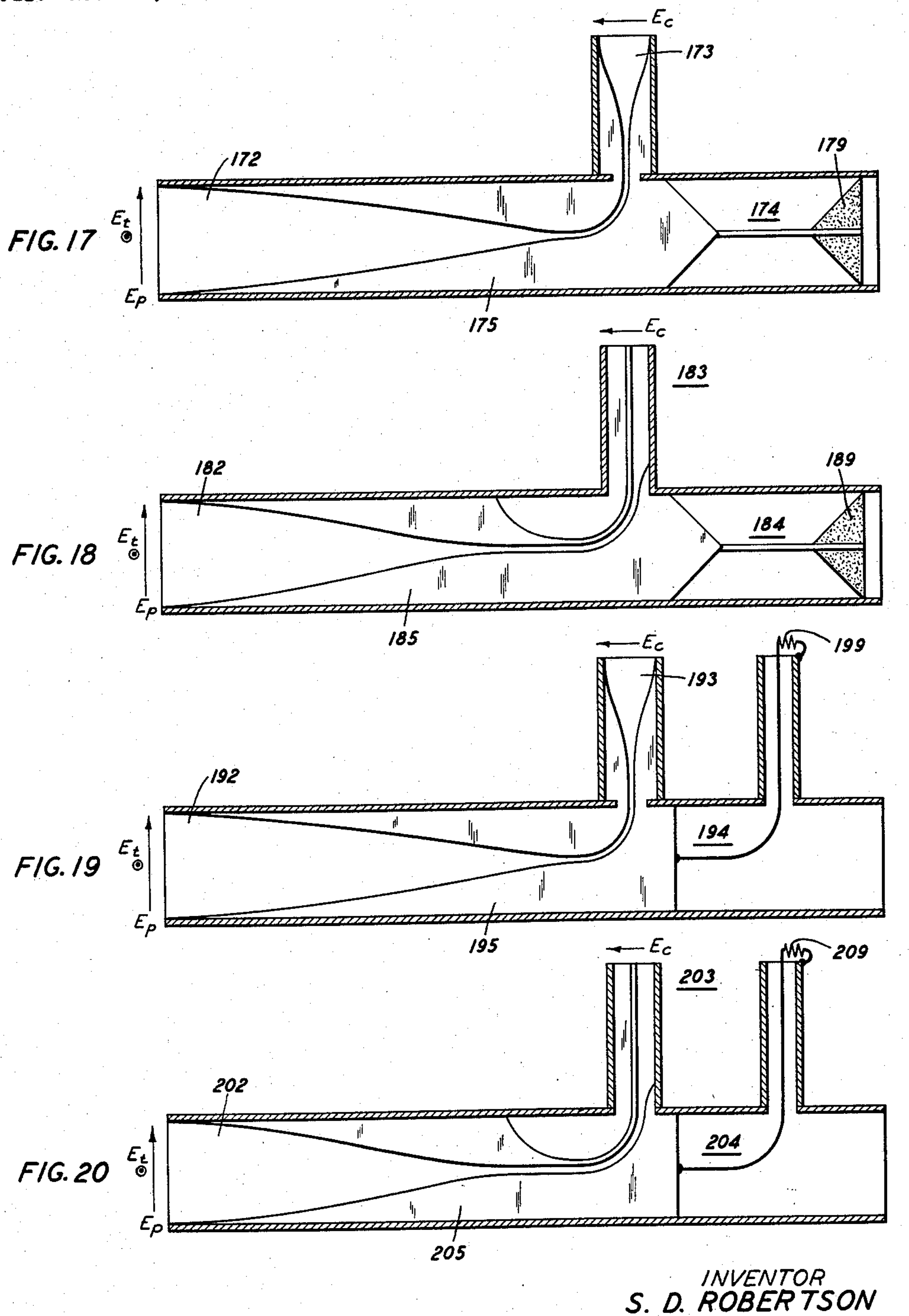

The finline couplers of Figs. 17 and 18 are modifications of the couplers of Figs. 15 and 16, respectively, wherein the lower finline elements 175 and 185 are tapered at their respective right-hand ends for matching to coaxial lines 174 and 184, respectively.

The finline couplers of Figs. 19 and 20 show additional modifications of the coupler of Figs. 15 and 16, respectively, for selectively attenuating wave energy in the half-cylinder modes. In each of these couplers, as in the couplers of Figs. 15 and 16, the lower conductive element of the coupler is terminated at its right-hand end by a coaxial line. Unlike the previous couplers, however, the center conductors 196 and 206 of coaxial lines 194 and 204, respectively, pass outside main hollow wave guide 192 and 202 to be terminated by a suitable coaxial line terminations 199 and 209, respectively. The center conductor of each of these coaxial line terminations is coplanar with the finline for avoiding disturbance of transverse wave $E_t$. The terminated coaxial lines attenuate wave energy in the half-cylinder mode which exists on both sides of the finline, as previously discussed.

Figures 21, 22, 23, 24:
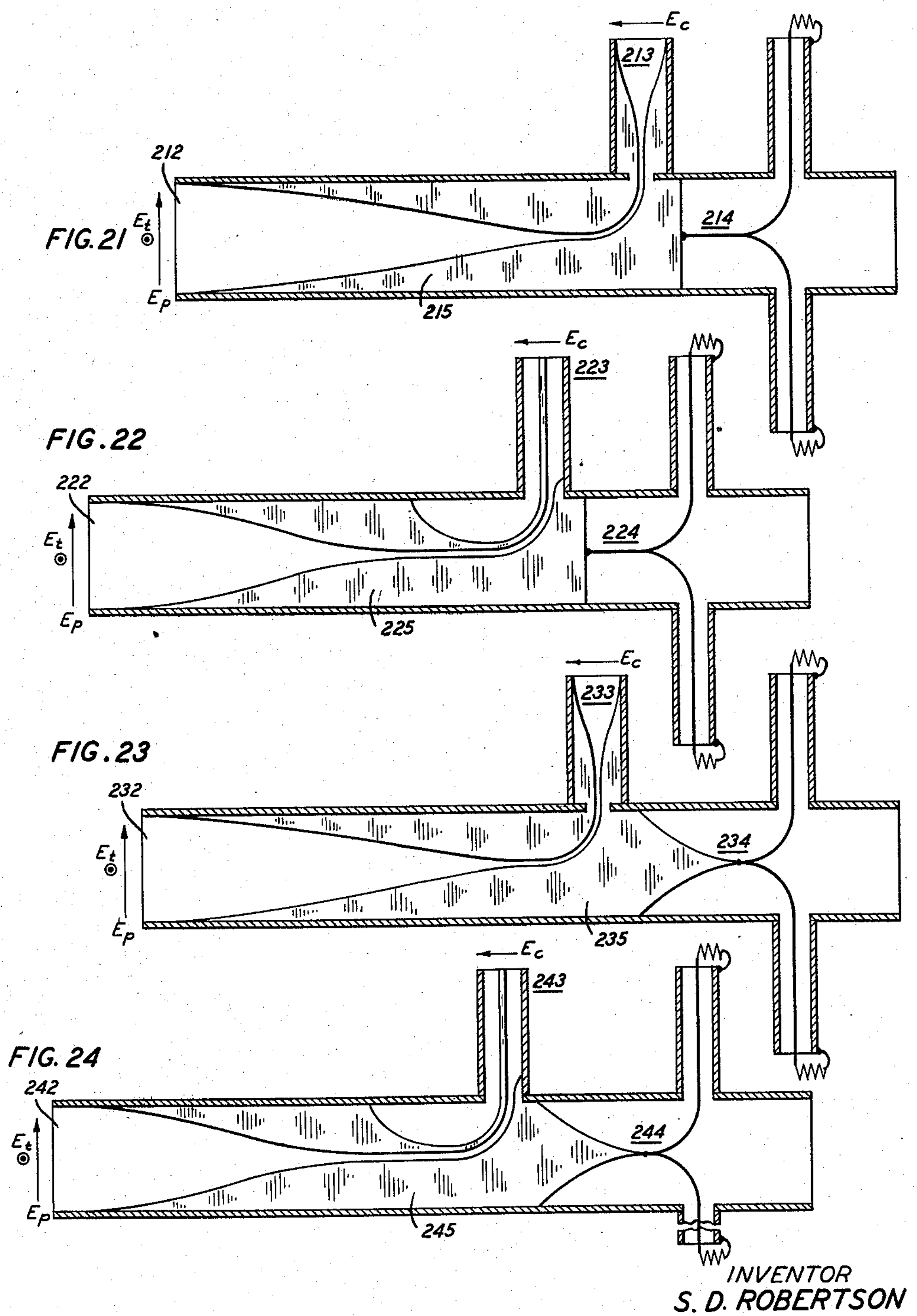

Figs. 21 and 22 are modifications of the couplers of Figs. 19 and 20, respectively. In the couplers of these figures the terminating coaxial lines of Figs. 19 and 20 are each modified to have two branches for providing terminating coaxial lines 214 and 224 for fin elements 215 and 225, respectively. The terminating coaxial lines 214 and 224 are coplanar with the respective fin elements and physically symmetrical about the axis of hollow wave guides 212 and 222, respectively. The couplers of Figs. 23 and 24 are modifications of the couplers of Figs. 21 and 22 which are characterized in that the right-hand ends of lower fin elements 235 and 245 are tapered for matching to terminating coaxial lines 234 and 244, respectively.

Figure 25:
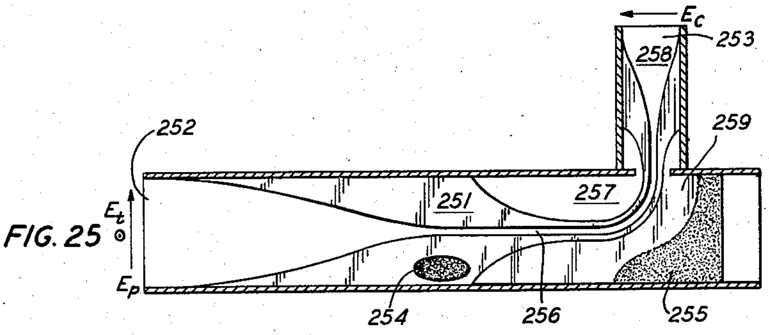
Figs. 25–28 are longitudinal sectional views of modifications of the invention which are characterized both by reduced coupling to the spurious modes and selective attenuation of those modes.

Fig. 25 shows a further embodiment of the present invention which is characterized both by reduced coupling to the spurious half-cylinder modes and by selective attenuation of those modes. The coupler of this figure includes finline sections 251 and 258 extending axially within hollow conductive wave guides 252 and 253, respectively, a section of balanced two-wire transmission line 257, and two lossy sections 254 and 255. The lossy sections are typically dielectric sheets suitably coated with a colloidal carbon deposit. In particular, lossy section 255 is a deposit of colloidal carbon on the right-hand end of a polystyrene card 259. Both lossy sections are spaced away from wave path 256 through the finline coupler to be out of coupling relation with wave energy passing along the finline wave path so that such wave energy is unaffected by the lossy sections. In operation, wave energy polarized in the plane of finline 251, in passing from left to right along wave guide 252, is coupled via finline 251, balanced two-wire line 257 and finline 258, to wave guide 253. Wave energy transverse to finline 251, however, will pass from left to right along wave guide 252 substantially undisturbed by the finline, two-wire line, or lossy sections. Half-cylinder modes initiated along the curved portion of wave path 256 tend to be canceled immediately because there is substantially no conductive barrier for separating two oppositely directed half-cylinder modes. Such cancellation virtually eliminates any loss of energy to the half-cylinder modes and is satisfactory for many application. For complete elimination of an energy loss to the half-cylinder modes, however, lossy sections 254 and 255 are advantageously included to damp out the resonance of any energy which is coupled to those modes.

Figure 26:
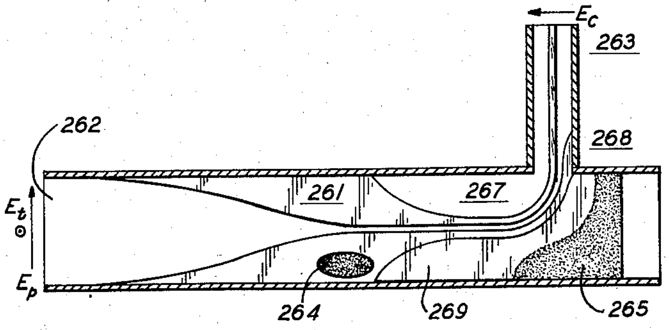

Fig. 26 is a modification of the finline coupler of Fig. 25 for coupling between a conductively-bounded wave guide 262 and a coaxial line 263. This coupler includes a finline section 261, a section of balanced two-wire line 267, a transition section 268 from the balanced two-wire line to coaxial line 263, and two lossy sections 264 and 265. The operation of this coupler is substantially as described for the coupler of Fig. 25.

Figure 27:
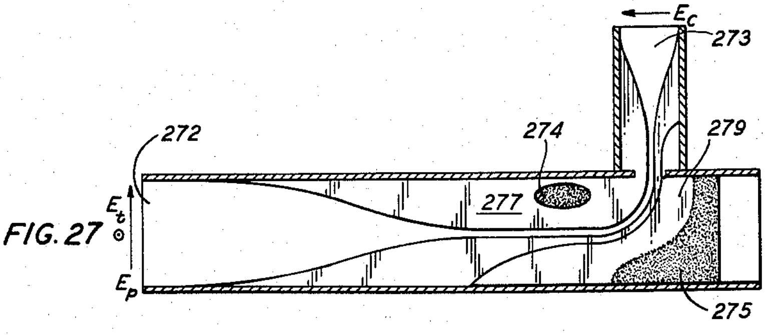
Figure 28:
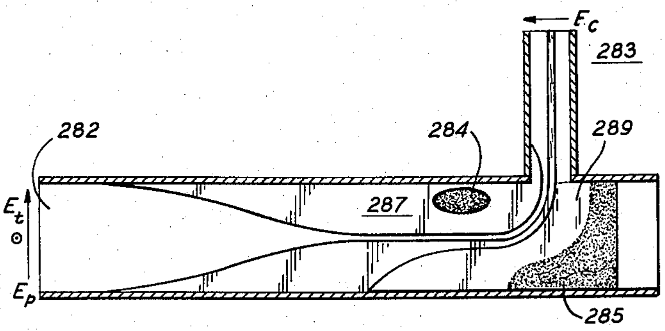

The couplers of Figs. 27 and 28 are modifications of the couplers of Figs. 25 and 26, respectively. In these couplers the sections of balanced two-wire transmission line 257 and 267 of Figs. 25 and 26, respectively, are replaced by intermediate transition sections 277 and 287, respectively. Intermediate transition sections 277 and 287 are similar to section 57 of Fig. 5 and thus each comprises two conductors with the lower conductor being a thin wire line and the upper conductor being a fin. The couplers of each of Figs. 27 and 28, as those of the previous two figures, are characterized both by reduced coupling ot the half-cylinder modes and by selective attenuation of those modes with appropriately positioned lossy sections.

It is understood that the above-described arrangements are merely illustrative of the principles of the present inventions. Various other arrangements can be devised by one skilled in the art in the light of this disclosure without departing from the spirit and scope of the invention. In particular, finline couplers of the type described may be modified for coupling more than two waveguiding paths as described in the aforementioned copending applications. Moreover, rectangular wave guide sections may be substituted for the circular wave guide sections shown.

What is claimed is:

1. Apparatus for transferring high frequency wave energy between first and second waveguiding paths comprising a finline section extending into the first waveguiding path in a plane parallel to the axis of said path and including two thin coplanar conductive fin elements forming a wave path whose transverse dimension is tapered at one end from that of the first waveguiding path to a predetermined smaller dimension, a two-conductor transition section extending into the second waveguiding path in a plane parallel to its axis and forming a wave path between said two conductors whose transverse dimension is tapered at one end from that of the second waveguiding path to said predetermined smaller dimension, a two-conductor transmission line joining said finline section and said transition section to form a continuous wave path, the conductors of the transmission line being spaced apart a distance equal to said predetermined smaller dimension, the sum of the transverse dimensions of said conductors of said transmission line and said predetermined distance being substantially less than the transverse dimension in said first waveguiding path, and means positioned along said first waveguiding path coplanar with and adjacent said fin elements for dissipating the energy of any undesired spurious modes.

2. Apparatus for transferring high frequency wave energy between first and second waveguiding paths comprising a finline section extending into the first waveguiding path in a plane parallel to the axis of said path, the finline section including two thin coplanar conductive fin elements forming a wave path whose transverse dimension is tapered at one end from the transverse dimension of the first waveguiding path to a predetermined smaller dimension, a two-conductor transition section extending into the second waveguiding path in a plane parallel to its axis and forming a wave path between said two conductors whose transverse dimension is tapered at one end from the transverse dimension of the second waveguiding path to said predetermined smaller dimension, the height of the fins of the finline section gradually diminishing to form a two-wire transmission line which extends to join the transition section for forming a continuous wave path between said finline section and said transition section, and the two wires of the two-wire line being spaced apart along their length a distance equal to said predetermined smaller dimension.

3. Apparatus for transferring high frequency wave energy between two waveguiding paths comprising first and second finline sections and a section of two-conductor transmission line intermediate the two finline sections, the sum of the transverse dimensions of the conductors of said transmission line being substantially less than the transverse dimension of said first waveguiding path, the finline sections comprising two thin coplanar fin elements spaced apart along their length for forming a wave path along the interspace between the fin elements, the wave path through each of the finline sections being tapered at one end and narrowed at the other end for forming an extension of the wave path through the two-conductor line, whereby a continuous wave path is formed between the two waveguiding paths.

4. A finline coupler for transferring wave energy between first and second waveguiding paths having predetermined transverse dimensions, comprising first and second finline sections and a section of two-conductor transmission line connected between said finline sections, the sum of the transverse dimensions of the conductors of said transmission line being substantially less than the transverse dimension of said first waveguiding path, the first finline section including two thin coplanar conductive fin elements spaced apart to form a wave path whose transverse dimension is tapered from that of the first waveguiding path to that of the wave path defined by the two wires of the two-wire line, and the second finline section including two thin coplanar conductive fin elements spaced apart to form a wave path whose transverse dimension is tapered from that of the second waveguiding path to that of the wave path between the conductors of the transmission line.

5. Apparatus for transferring high frequency wave energy between first and second angularly disposed hollow wave guides having predetermined transverse dimensions, comprising a first finline section extending into the first hollow wave guide in an axial plane and including two thin coplanar conductive fin elements forming a wave path whose transverse dimension is tapered at one end from that of the first hollow wave guide to a predetermined smaller dimension, a second finline section extending into the second hollow wave guide in an axial plane and comprising two thin coplanar conductive fin elements forming a wave path whose transverse dimension is tapered at one end from that of the second hollow wave guide to said predetermined smaller dimension, and a section of two-conductor line joining the other ends of said first and second finline sections to form a continuous wave path therebetween, the two conductors of the two-conductor line being spaced apart a distance equal to said predetermined smaller dimension, and having together a transverse dimension substantially less than the transverse dimension of said first hollow wave guide.

6. Apparatus according to claim 5 in combination with a sheet of energy dissipative material mounted coplanar with one of said finline sections for dissipating the energy in an undesired spurious mode appearing in the region of said section.

7. Apparatus for transferring high frequency wave energy between said first and second waveguiding paths, comprising a finline section extending into the first waveguiding path in a plane parallel to the axis of said path, the finline section including two thin coplanar conductive fin elements forming a wave path whose transverse dimension is tapered at one end from that of the first waveguiding path to a predetermined smaller dimension, a two-conductor transition section extending into the second waveguiding path in a plane parallel to its axis and forming a wave path between said two conductors whose transverse dimension is tapered at one end from that of the second waveguiding path to said predetermined smaller dimension, and a two-conductor transmission line joining said finline section and said transition section to form a continuous wave path, the two conductors of the two-conductor line being spaced apart a distance equal to said predetermined smaller dimension, and having together a transverse dimension substantially less than the transverse dimension of said first hollow wave guide.

8. The combination of elements set forth in claim 7 wherein the two-conductor transmission line is coplanar with the finline section throughout its length along the first waveguiding path.

9. The combination of elements set forth in claim 7 wherein the two-conductor transmission line is a balanced line.

10. Apparatus for transferring high frequency wave energy between a wave guide and a second hollow waveguiding path comprising a finline section extending into the wave guide in a plane parallel to the axis of said wave guide, the finline section including two thin coplanar conductive fin elements forming a wave path whose transverse dimension is tapered at one end from that of the wave guide to a predetermined smaller dimension, a two-conductor transition section extending into and connecting with said hollow waveguiding path and forming a wave path between said conductors whose transverse dimension at the end in said wave guide is equal to said predetermined dimension, and a two-conductor transmission line joining said finline section and said transition section to form a continuous wave path, the spacing of the conductors of said transmission line equaling said predetermined dimension and the sum of the transverse dimensions thereof being substantially less than the transverse dimension of said wave guide.

11. Apparatus according to claim 10 in combination with a coaxial transmission line having an inner conductor connected to one of said fin elements and provided with a sheet of lossy material coplanar with said one of said fin elements and connected to terminate said coaxial line at the end remote from that connected to said one of said fin elements.

12. Apparatus according to claim 10 in combination with a coaxial transmission line having an axis coplanar with one of said fins and having an inner conductor connected with said one of said fins, and means for terminating said coaxial line in its characteristic impedance at the end remote from that connected to said one of said fin elements.

13. Apparatus according to claim 10 in which one of said fin elements is tapered along said wave guide at its end away from the tapered section of said wave path in combination with a coaxial transmission line having an axis coplanar with said one of said fin elements and having an inner conductor connected to said one of said fin elements at its tapered end, and energy dissipating means for terminating said coaxial transmission line at a point remote from that at which it is connected to said one of said fin elements.

References Cited in the file of this patent

UNITED STATES PATENTS

| | | |
|---|---|---|
| 2,199,083 | Schelkunoff | Apr. 30, 1940 |
| 2,317,503 | Usselman | Apr. 27, 1943 |
| 2,603,710 | Bowen | July 15, 1952 |
| 2,684,469 | Sensiper | July 20, 1954 |
| 2,691,731 | Miller | Oct. 12, 1954 |
| 2,692,977 | Koppel | Oct. 26, 1954 |
| 2,705,779 | Weber et al. | Apr. 5, 1955 |
| 2,706,278 | Walker | Apr. 12, 1955 |
| 2,710,945 | Edson | June 14, 1955 |